United States Patent Office 3,291,800
Patented Dec. 13, 1966

3,291,800
3-SUBSTITUTED DERIVATIVES OF YOHIMBANE ALKALOIDS AND PROCESS FOR THEIR PRODUCTION
John Shavel, Jr., Mendham, and Harold Zinnes, Rockaway, N.J., assignors to Warner-Lambert Pharmaceutical Company, Morris Plains, N.J., a corporation of Delaware
No Drawing. Filed July 23, 1963, Ser. No. 296,938
4 Claims. (Cl. 260—288)

The present invention relates to new and novel 3-substituted derivatives of yohimbane alkaloids having the formula:

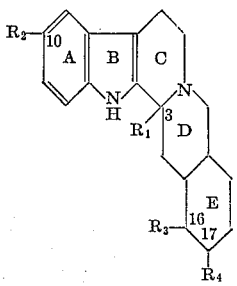

wherein $R_1$ represents lower alkyl such as methyl, ethyl, propyl, isopropyl, butyl, isobutyl and the like, aryl such as phenyl or aralkyl such as benzyl; $R_2$ represents hydrogen, lower alkyl such as methyl, ethyl, propyl, isopropyl and the like, lower alkoxy such as methoxy or ethoxy or acetyl; $R_3$ represents hydrogen or lower alkyl and $R_4$ represents hydrogen, hydroxy or keto and to the nontoxic pharmaceutically acceptable acid addition and quaternary ammonium salts thereof.

This invention also encompasses within its scope processes for the production of these 3-substituted derivatives of yohimbane.

The compounds of this invention have significant and interesting pharmacological activity as analgesics, tranquilizers and anti-inflammatory agents. In addition, these compounds are valuable intermediates in the production of other compounds of the yohimbane series.

The compounds of this invention bear the A, B, C, D and E rings as depicted in the above structural formula and are, generally, alkaloids of the yohimbane series. The use of a straight line in the above structural formula throughout this specification and in the claims generally denotes the attachment of a radical or substituent at a particular position and is not used to indicate alpha or beta orientation.

It has been found that compounds of this invention may be prepared by treating a 3-dehydroyohimbane salt with an organolithium compound of the formula $R_1Li$ in which $R_1$ may be lower alkyl, aryl or aralkyl as defined above. Other 3-dehydroyohimbane derivatives such as 3-dehydro-17-hydroxyyohimbane perchlorate, 3-dehydro-16α-methyl-17β-hydroxyyohimbane chloride and the like may also be conveniently employed. The reaction may be represented by the following equation:

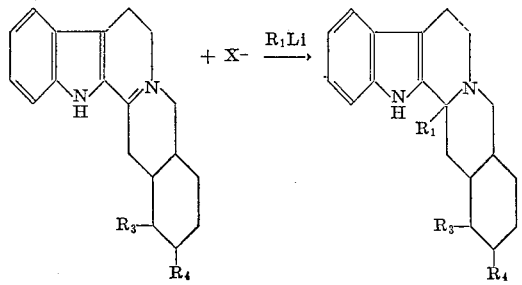

In the above equation, X represents an anion, such as sulfate, chloride, phosphate, perchlorate, acetate and the like. Instead of employing a 3-dehydroyohimbane salt as the starting material, 3-cyanoyohimbane of the formula:

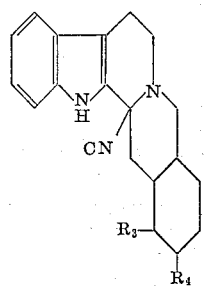

may also be treated with the lithium compound $R_1Li$ to give the desired 3-alkyl, aryl or aralkyl substituted yohimbanes. The 3-cyanoyohimbane used as the starting material is described and claimed in our copending application entitled "3-Cyano-Yohimbane Derivatives," Serial No. 293,904, filed July 9, 1963, now abandoned.

An alternate pathway for the production of 3-aralkyl substituted yohimbanes is available by treating either a 3-dehydroyohimbane salt or 3-cyanoyohimbane with a Grignard reagent of the formula R—MgBr, such as, for example, benzylmagnesium bromide.

Generally, the 3-substituted yohimbanes obtained in accordance with the above-described reaction may be modified further to give other derivatives.

Thus, for example, 3-alkyl or 3-aryl substituted 17-hydroxyyohimbanes may be acetylated at 10-position, for example, by reacting with acetylating agents such as acetic anhydride in boron trifluoride. In addition, they may be oxidized to give the corresponding yohimbones and the latter may also be acetylated to give 10-acetylated 3-alkyl or 3-aryl yohimbones. The 10-acetylated 3-substituted yohimbanes may, in turn, be treated to give corresponding 10-hydroxy derivatives. The 10-hydroxy compounds, of course, can be treated with a diazo-lower alkane at room temperature to give 10-lower alkoxy substituted compounds. The process to prepare these 10-lower alkoxy substituted yohimbanes is described in John Shavel's copending application Serial No. 119,829 entitled "10-Substituted Derivatives of Yohimbane Alkaloids and Process Therefor," filed June 27, 1961, now having matured to U.S. 3,139,434. These compounds are also within the scope of this invention.

The compounds of this invention may be converted into their pharmaceutically acceptable nontoxic acid addition or quaternary ammonium salts. Useful acid addition salts are those formed with such acids as maleic, fumaric, benzoic, succinic, methylsulfonic, sulfonic, citric, tartaric, salicylic, malic, cinnamic, hydrochloric, hydrobromic, phosphoric and the like. The acid addition salts may be prepared in the conventional manner, for example, by treating a solution or suspension of the free base in an organic solvent with the desired acid, and then recovering the salt which forms by crystallization techniques. The quaternary salts are prepared by heating a solution of the base in a suitable solvent with a reactive alkyl halide such as methyl iodide, ethyl bromide, n-hexyl bromide, benzyl chloride or another reactive ester such as methyl sulfate, ethyl sulfate or methyl p-toluene sulfonate.

For therapeutic use, the new and novel compounds of this invention, either as the free base or in the form of a pharmaceutically acceptable, nontoxic acid addition or quaternary ammonium salt, may be formulated with a conventional pharmaceutical carrier to form tablets, capsules, elixers, solutions, suspensions, suppositories and the like.

The following examples are included in order further to illustrate the present invention. Room temperature as used hereinafter refers to a temperature range of 20° to 30° C.

EXAMPLE 1

*3-methylyohimbane from 3-dehydroyohimbane perchlorate*

A mixture of 11.4 g. 3-dehydroyohimbane perchlorate and 0.25 mol methyllithium in 250 ml. ether is refluxed with stirring for seven hours. A mixture formed is poured on ice water, the layers are separated, and the aqueous layer is extracted with ether. The ether solution is distilled to dryness to give an oil which on trituration with 10 ml. methanol yields 2.4 g. of 3-methylyohimbane as the crystalline methanolate, M.P. 127°–130° C. (softens at 90° C.), $[\alpha]_D$ −92 (pyridine, c.=0.65), which gives a single spot on ionophoresis and paper chromatography and whose ultraviolet spectrum (in acidified ethanol) shows complete absence of 3-dehydroyohimbane. Recrystallization from methanol gives a purified material dried in vacuo at 80° C.), M.P. 130°–132° C. (softens at 90° C.), $[\alpha]_D$ −91 (pyridine, c.=0.62), $[\alpha]_D$ −64 (chloroform, c.=0.55), $[\alpha]_D$ −62 (ethanol, c.=0.60).

Analysis for $C_{20}H_{26}N_2 \cdot CH_3OH$: Calc.: C, 77.25; H, 9.26; N, 8.58. Found: C, 77.04; H, 9.15; N, 8.32.

A sample is dried in vacuo at 110° C. for 8 hours to give material, M.P. 130°–132° C., $[\alpha]_D$ −98 (pyridine, c.=0.65), $[\alpha]_D$ −70 (chloroform, c.=0.62), $[\alpha]_D$ −67 (ethanol, c.=0.59)

$\nu_{max}^{Nujol}$ 3420, 3270, 752, 746, $\nu_{max}^{CHCl_3}$ 3470, 1294. $\lambda_{max}^{95\% EtOH}$ 225 (36,600), 272 (shoulder: 7250), 279–282 (7500), 289 (6400), $\lambda_{min}$ 245 (2200), 286 (6300)

Analysis for $C_{20}H_{26}N_2$: Calc.: C, 81.58; H, 8.90; N, 9.52. Found: C, 81.83; H, 9.04; N, 9.73.

EXAMPLE 2

*3-methylyohimbane from 3-cyanoyohimbane*

To a solution of 0.5 mol methyllithium in 375 ml. ether is added a solution of 15.3 g. 3-cyanoyohimbane in 200 ml. dry benzene. An additional 550 ml. more benzene is added and the mixture is refluxed with stirring for eight hours, the reflux temperature being 56° C. It is poured on ice water, the layers are separated, and the aqueous layer is extracted with three 200 ml. portions of ether. The combined organic layer is washed with 30 ml. water and then extracted with five 250 ml. portions of 15% aqueous acetic acid. The acetic acid solution is basified with ammonium hydroxide and the resulting precipitate is collected by filtration, washed with water, dried, recrystallized from 50 ml. methanol, and dried in vacuo at 80° C. to give 6.6 g. of 3-methylyohimbane, M.P. 127°–130° C. (softens at 90° C.), $[\alpha]_D$= −91 (pyridine, c.=0.54), which gives a single spot on ionophoresis and paper chromatography corresponding exactly with those given by 3-methylyohimbane prepared in accordance with Example 1. The ultraviolet spectrum in acidified ethanol solution shows complete absence of the max. at 350 mμ which is characteristic of 3-dehydroyohimbane salts.

EXAMPLE 3

*3-phenylyohimbane from 3-dehydroyohimbane perchlorate*

A mixture of 11.4 g. 3-dehydroyohimbane perchlorate and 0.3 mol phenyllithium in 400 ml. ether is refluxed with stirring for nineteen hours. The reaction mixture is poured on ice water, the layers separated and the aqueous layer then extracted with ether. The combined ether solution is dried over sodium sulfate and is treated with ethereal hydrogen bromide. The first material to precipitate is collected and recrystallized from acetone to give 1.7 g. of yellow crystals which could be shown by ionophoresis and ultraviolet spectrum to be 3-dehydroyohimbane chloride. On the addition of more ethereal hydrogen bromide there is obtained a dark green gum which solidifies on trituration with water. The solid is recrystallized once from acetonitrile and once from methanol to give 1.3 g. 3-phenylyohimbane hydrobromide, M.P. 287°–294° C. dec. (starts to darken at ca. 220° C.).

Analysis for $C_{25}H_{29}N_2Br \cdot \frac{1}{2}CH_3OH$: Calc.: C, 67.54; H, 6.89; N, 6.18; Br, 17.63. Found: C, 67.84; H, 6.79; N, 5.89; Br, 17.68.

A suspension of 700 mg. of the recrystallized hydrobromide in an excess of aqueous ammonium hydroxide is shaken with methylene chloride. The methylene chloride solution is dried over sodium sulfate and distilled to dryness to give a residue which is recrystallized from methanol to give 400 mg. of 3-phenylyohimbane base, M.P. 237°–240° C. dec., $[\alpha]_D$= −179 (pyridine, c.=0.62). The acetonitrile and methanol filtrates from the hydrobromide recrystallization are evaporated to dryness and the residue is dissolved in 100 ml. methanol, and an excess of aqueous ammonium hydroxide is added. A small amount of dark insolubles is filtered off, the solution is heated to boiling, and 90 ml. water is added. The yellow precipitate which separates on cooling to room temperature is collected by filtration, washed with water, dried, and is recrystallized from methanol to give 1.5 g. of 3-phenylyohimbane base, M.P. 235°–239° C. dec., $[\alpha]_D$= −177 (pyridine, c.=0.57). Recrystallization from methanol gives material, M.P. 238°–241° C. dec. (starts to darken at 197° C.), $[\alpha]_D$= −181 (pyridine, c.=0.54), $[\alpha]_D$= −160 (chloroform, c.=0.51).

$\nu_{max}^{Nujol}$ 3420, 746, 706. $\nu_{max}^{CHCl_3}$ 3420, 1618, 1597, 1292, 983, $\lambda_{max}^{95\% EtOH}$ 228 (38,500), 284 (9750), 291 (8750), $\lambda_{min}$ 251–252 (3800), 289 (8500)

Analysis for $C_{25}H_{28}N_2$: Calc.: C, 84.22; H, 7.92; N, 7.86. Found: C, 84.43; H, 8.12; N, 8.03.

EXAMPLE 4

*3-phenylyohimbane from 3-cyanoyohimbane*

To 0.5 mol phenyllithium in 400 ml. ether is added a solution of 15.3 g. 3-cyanoyohimbane in 800 ml. benzene, and the mixture is refluxed with stirring for ten hours. It is poured on ice water, the layers are separated, and the aqueous layer is extracted with ether. The combined organic layer is extracted with five 200 ml. portions of 20% aqueous acetic acid, washed with two portions of aqueous ammonium hydroxide, dried over sodium sulfate, and distilled to dryness. The residue is triturated with 30 ml. methanol to give 4.7 g. of 3-phenylyohimbane as crystals, M.P. 235°–238° C. dec., $[\alpha]_D$= −176 (pyridine, c.=0.65), which gives a single spot on ionophoresis and paper chromatography and whose ultraviolet spectrum shows it to be free of 3-dehydroyohimbane.

EXAMPLE 5

*3-benzylyohimbane*

Benzylmagnesium bromide is prepared by dropwise addition of a solution of 34 g. benzyl bromide in 400 ml. ether to a stirred suspension of 15.8 g. magnesium in 100 ml. ether. When addition is completed the mixture is stirred at room temperature for one hour longer and then refluxed forty-five minutes. To the Grignard reagent thus prepared is added 12 g. 3-dehydroyohimbane chloride. The reaction mixture is stirred at room temperature for 4 hours, allowed to stand at room temperature overnight, and is then poured into a solution of 30 g. ammonium chloride in 600 ml. ice water. After separation of the layers, the aqueous layer is extracted with several portions of ether, the combined ether solution is dried over sodium sulfate, and is evaporated to dryness. The residue is dissolved in 200 ml. 50% acetic acid, water is added to reduce the acetic acid concentration to 15%, and partial neutralization to pH 4 is carried out by the addition of ammonium hydroxide. The aqueous solution is decanted from the gum which precipitates and the latter is dissolved in methylene chloride. This solution is dried over sodium sulfate, evaporated to dryness, and the residue is crystallized from methanol to give 6.7 g. of 3-benzylyohimbane, M.P. 221°–222° C. dec., $[\alpha]_D = -193$ (chloroform, c.=0.55). In addition there is obtained 0.8 g. of a second crop, M.P. 214°–216° dec., $[\alpha]_D = -199$ (chloroform, c.=0.54). Recrystallization of the first crop from methanol gives material, M.P. 222°–223° C., $[\alpha]_D = -192$ (chloroform, c.=0.56), $[\alpha]_D = -4$ (pyridine, c.=0.51), $\nu_{max.}^{Nujol}$ 3420, 1600, 760, 740, 730 cm.$^{-1}$, $\lambda_{max.}^{95\% EtOH}$ 225 (39,000), 275 (shouder: 7500), 282–283 (8000), 240 (7000), $\lambda_{min.}$ 253 (3500), 288 (6800) m$\mu$.

Analysis for $C_{26}H_{30}N_2$: Calc.: C, 84.28; H, 8.16; N, 7.56. Found: C, 84.05; H, 8.29; N, 7.76.

EXAMPLE 6

3,16α-dimethyl-17α-hydroxyyohimbane

A mixture of 16.5 g. 3-dehydro-16α-methyl-17α-hydroxyyohimbane chloride, 0.5 mol methyllithium, 400 ml. ether, and 900 ml. benzene is refluxed with stirring for seven hours. It is poured on ice water, the layers are separated, and the aqueous layer is extracted with ether. The combined organic layer is washed with water, extracted with five 200 ml. portions of 15% acetic acid, and the acetic acid solution is basified with ammonium hydroxide. The resulting precipitate is filtered off, washed with water, dried, and recrystallized twice from ethyl acetate to give 5.5 g. of 3,16α-dimethyl-17α-hydroxyyohimbane, M.P. 206°–213° C. dec. (darkens at 195° C.), $[\alpha]_D = +14$ (pyridine, c.=0.61). Another recrystallization from the same solvent gives material, M.P. 211°–222° C. dec., $[\alpha]_D = +14$ (pyridine, c.=0.61).

Analysis for $C_{21}H_{28}N_2O$: Calc.: C, 77.74; H, 8.70; N, 8.64. Found: C, 77.95; H, 8.56; N, 8.84.

EXAMPLE 7

3,16α-dimethylyohimbone

A mixture of 8.8 g. of 3,16α-dimethyl-17α-hydroxyyohimbane, 550 ml. xylene, and 220 ml. cyclohexanone is distilled at atmospheric pressure until 100 ml. of distillate is collected. After cooling to room temperature, 39 g. of aluminum phenoxide is added and refluxed with stirring for 24 hours. The reaction mixture is cooled to room tempearture and is extracted with three 275 ml. portions of 40% potassium hydroxide. The organic layer is extracted with five 250 ml. portions 15% acetic acid, the aqueous solution is made strongly basic with ammonium hydroxide and extracted with chloroform. The dried chloroform solution is distilled in vacuo to give an oil which solidifies on trituration with petroleum ether. This solid is collected and recrystallized from ethanol to give 5.0 g. (two crops) of 3,16α-dimethylyohimbone, M.P. 255°–260° C. dec., $[\alpha]_D = -69$ (pyridine, c.=0.83). Recrystallization from methanol gives material, M.P. 255°–260° C. dec., $[\alpha]_D = -70$ (pyridine, c.=0.60).

Analysis for $C_{21}H_{26}N_2O$: Calc.: C, 78.22; H, 8.13; N, 8.69. Found: C, 78,45; H, 8.22; N, 8.76.

EXAMPLE 8

3-methyl-17β-hydroxyyohimbane

A mixture of 33 g. 3-dehydro-17β-hydroxyyohimbane chloride, 1 mol methyllithium, 875 ml. ether, and 2000 ml. dry benzene is refluxed with stirring for twenty hours. It is poured on ice water, the layers are separated, and the aqueous layer is extracted with ether. An insoluble solid which remains at the interface is collected by filtration. It weighs 4.1 g. and is shown by ionophoresis and paper chromatography to consist completely of 3-dehydro-17β-hydroxyyohimbane base. The combined organic layers are dried over sodium sulfate and distilled at atmospheric pressure until the resulting mixture begins to bump. It is filtered while hot to give 3.7 g. of crystalline material which is also shown to consist wholly of 3-dehydro-17β-hydroxyyohimbane base. The filtrate is extracted with 15% acetic acid, and the aqueous solution is made basic with ammonium hydroxide. The resulting precipitate is filtered off, washed with water, and sucked dry. Ionophoresis and paper chromatography shows it to be almost free of the starting 3-dehydro compound. It is dried by azeotropically distilling with benzene and is triturated with 25 ml. methanol to give 11.4 g. of 3-methyl-17β-hydroxyyohimbane, M.P. 136°–138° C. (with evolution of gas) $[\alpha]_D = -75$ (pyridine, c.=0.62). Recrystallization from methanol gives material (dried in vacuo at 110° C. for 16 hours), M.P. 139°–142° C. (with evolution of gas), $[\alpha]_D = -73$ (pyridine, c.=0.60).

Analysis for $C_{20}H_{26}N_2O \cdot \frac{1}{2} CH_3OH$: Calc.: C, 75.51; H, 8.64. Found: C, 75.58; H, 8.60.

A sample is dried in vacuo at 140° C. for 3 hours, M.P. 144°–148° C., $[\alpha]_D = -80$ (pyridine c.=0.73).

Analysis for $C_{20}H_{26}N_2O$: Calc.: C, 77.38; H, 8.44; N, 9.02. Found: C, 77.10; H, 8.66; N, 8.99.

The two crops of 3-dehydro-17β-hydroxyyohimbane base are combined and recrystallized from methanol to give 5.4 g. of material $[\alpha]_D = +69$ (pyridine, c.=0.60).

EXAMPLE 9

3-methylyohimbone

A mixture of 6.2 g. 3-methyl-17β-hydroxyyohimbane, 300 ml. dry benzene, and 150 ml. cyclohexanone (previously dried over sodium sulfate) is distilled at atmospheric pressure until 300 ml. distillate is collected. The mixture is cooled to room tempearture, 26 g. aluminum phenoxide is added, and it is refluxed for 53 hours after which a paper chromatogram shows that only about 75% conversion has taken place. The reaction mixture is extracted with three 200 ml. portions of 40% potassuim hydroxide followed by four 100 ml. portions of 15% acetic acid. The acetic acid solution is basified with ammonium hydroxide and the resulting solid is collected by filtration. It is dissolved in chloroform, the solution is dried over sodium sulfate and is concentrated to a volume of about 150 ml. This is chromatographed over a Florisil volumn (55 g.) using chloroform as the eluant. The first 300 ml. of eluate is evaporated to dryness to yield 2.3 g. of 3-methylyohimbone, M.P. 152°–157° C., $[\alpha]_D = -86$ (pyridine, c.=0.53), whose chromatogram showed it to be completely free of the starting alcohol. Recrystallization from acetonitrile gives material, M.P. 170°–172° C., $[\alpha]_D = -88$ (pyridine, c.=0.74).

Analysis for $C_{20}H_{24}N_2O$: Calc.: C, 77.88; H, 7.84; N, 9.08. Found: C, 77.80; H, 7.92; N, 9.20.

Further elution of the column with chloroform followed by chloroform containing 1% and 5% methanol, respectively, gives 1.75 g. of the starting alcohol as is shown by its paper chromatogram.

EXAMPLE 10

10-acetyl-3-methylyohimbone

A solution of 20 ml. acetic acid in 200 ml. acetic anhydride is saturated with boron trifluoride by passing in the latter for about 15 minutes, maintaining a temperature of —15° to —25° C. To this is slowly added a solution of 6 g. 3-methylyohimbone in 30 ml. acetic acid. The reaction mixture is stirred at —15° to —25° C. for three hours, poured on ice water, made strongly basic with ammonium hydroxide, and extracted with methylene chloride. The methylene chloride solution is dried over sodium sulfate and distilled in vacuo to dryness. A solution of the residue and 3.5 g. sodium methoxide in 150 ml. methanol is refluxed for 30 minutes. The methanol is removed by distillation in vacuo, 100 ml. water is added, and the resulting solid is filtered off, washed with water, and sucked dry. It is further dried by dissolving in benzene and distilling to dryness. The residue is redissolved in 50 ml. chloroform and is chromatographed over 60 g. Florisil, using chloroform as the eluant. The first 1000 ml. of eluate is evaporated to dryness and the sidue is recrystallized from benzene to give 1.3 g. of 0-acetyl-3-methylyohimbone, M.P. 263°–265° C. dec., $[\alpha]_D = -56$ (pyridine, c.=0.54).

$\nu_{max}^{nujol}$ 3360, 1710, 1670, 1624, 1595, 808 cm.$^{-1}$, $\lambda_{max}^{95\% EtOH}$ 257 (1,700), 290–300 (9000), $\lambda_{min}$ 226 (6000), 278(7500), m$\mu$.

Analysis for $C_{22}H_{26}N_2O_2$: Calc.: C, 75.40; H, 7.48; N, 7.99. Found: C, 75.62; H, 7.32; N, 8.26.

EXAMPLE 11

*3-methyl-17-hydroxy-18-benzylideneyohimbane*

A mixture of 29 g. 3-dehydro-17-hydroxy-18-benzylideneyohimbane chloride, 0.7 mol methyllithium in 560 ml. ether, and 1400 ml. benzene is refluxed with stirring for twenty-seven hours. The reaction mixture is poured in ice water, the layers are separated and the aqueous layer is extracted with several portions of ether. The combined organic layers are extracted with four 400 ml. portions of 15% acetic acid and the aqueous solution is made strongly basic with ammonium hydroxide. The mixture is extracted with chloroform and the dried chloroform solution is evaporated to dryness to give an amorphous material whose ultraviolet spectrum shows it to be a mixture of the desired 3-methyl compound and the starting 3-dehydro compound. The material is redissolved in 375 ml. 25% acetic acid, filtered and 375 ml. water is added. The solid which separates out is filtered off, washed with 100 ml. 15% acetic acid followed by 100 ml. water, and then slurried with dilute ammonium hydroxide solution; it is collected, washed with water, and sucked dry. The ultraviolet spectrum shows that only a trace of the starting 3-dehydro compound is present. The solid is recrystallized to yield 2.2 g. of a first crop of 3-methyl-17-hydroxy-18-benzylideneyohimbane in the form of white crystals and two further crops are obtained on concentration of the filtrate. The second and third crops are recrystallized again from methanol to yield crystals which are combined with those of the first crop to give a total of 3.5 g. of material, M.P. 262°–264° C. dec., $[\alpha]_D = -340$ (pyridine, c.=0.68). Recrystallization of a portion from methanol gives material, M.P. 262°–263° C. dec., $[\alpha]_D = -335°$ (pyridine, c.=0.66).

Analysis for $C_{27}H_{31}N_2O$: Calc.: C, 81.16; H, 7.82; N, 7.01. Found: C, 81.08; H, 7.84; N, 7.12.

It is to be understood that the foregoing detailed description is given merely by way of illustration and that many variations may be made therein without departing from the spirit of our invention.

Having described our invention, what we desire to secure by Letters Patent is:

1. 3-phenylyohimbane melting with decomposition at 235°–238° C. and having an optical rotation of about $[\alpha]_D$ —176 (pyridine, c.=0.65).

2. Process for the production of a compound of the formula:

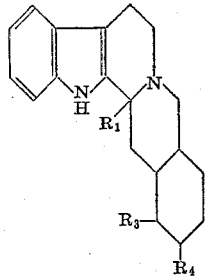

wherein $R_1$ is a member selected from the group consisting of lower alkyl, phenyl and benzyl and $R_3$ is a member selected from the group consisting of hydrogen and lower alkyl and $R_4$ is a member selected from the group consisting of hydrogen and hydroxy which comprises refluxing a member selected from the group consisting of those having the formula:

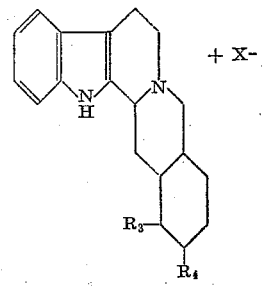

and

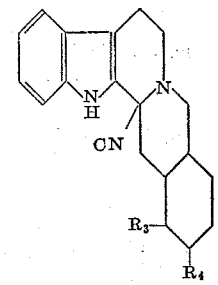

in which X is an anion selected from the group consisting of acetate, chloride, sulfate, phosphate and perchlorate and $R_3$ and $R_4$ have the same meaning as defined with a compound of the formula $R_1Li$.

3. Process for the production of a compound of the formula:

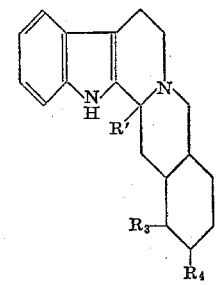

wherein R′ is benzyl and $R_3$ is a member selected from the group consisting of hydrogen and lower alkyl and $R_4$ is a member selected from the group consisting of hydrogen and hydroxy which comprises refluxing a member selected from the group consisting of those having the formula:

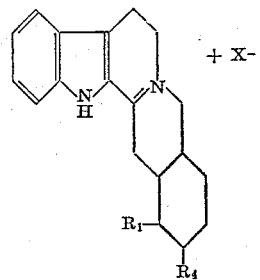

and

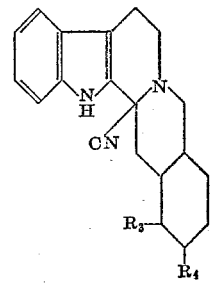

in which X is an anion selected from the group consisting of sulfate, chloride, perchlorate, phosphate and acetate with a compound of the formula R′MgBr in which R′ has the same meaning as defined.

4. 3-benzylyohimbane melting at 214–216° C. with decomposition and having an optical rotation of about $[\alpha]_D$ −192 (chloroform, c.=0.56) and $[\alpha]_D$ −4 (pyridine, c.=0.51).

References Cited by the Examiner

UNITED STATES PATENTS

| | | | |
|---|---|---|---|
| 3,048,593 | 8/1962 | Shavel et al. | 260—288 |
| 3,096,245 | 7/1963 | Shavel et al. | 167—67 |
| 3,120,528 | 2/1964 | Shavel | 260—287 |
| 3,139,428 | 6/1964 | Shavel et al. | 260—240 |

FOREIGN PATENTS 1,256,524   2/1961   France.

OTHER REFERENCES

Corsano et al.: Chem. Abs., vol. 53 (1959), p. 20107.
Karrer: Helv. Chim. Acta, vol. 35 (1952), pp. 1932 and 1933.
Muller et al.: Naturwissenschaften, vol. 47 (1960), p. 82.
Swan: J. Chem. Soc. (1950), p. 1534.
Vejdelek et al.: Chem. Abs., vol. 53 (1959), p. 3256.
Wenkert et al.: Jour. Amer. Chem. Soc., vol. 81 (1959), p. 1476.

WALTER A. MODANCE, *Primary Examiner.*

JOHN D. RANDOLPH, *Examiner.*

J. A. PATTEN, *Assistant Examiner.*